Figure 1:
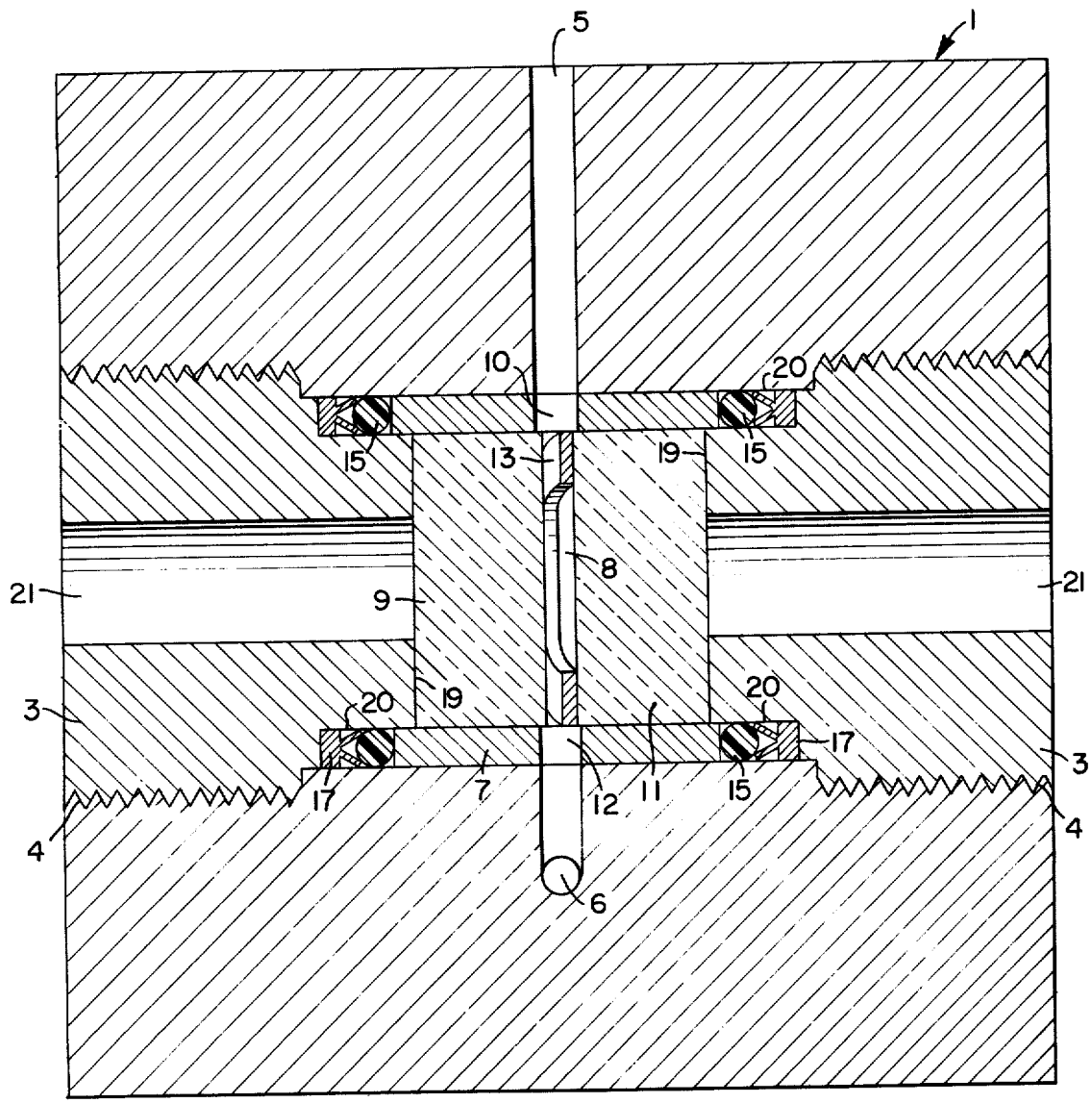

United States Patent [19]

Walker et al.

[11] 3,886,364
[45] May 27, 1975

[54] HIGH PRESSURE INFRARED CELL

[75] Inventors: Wellington E. Walker, Charleston; Lowell A. Cosby, St. Albans; Sterling T. Martin, Charleston, all of W. Va.

[73] Assignee: Union Carbide Corporation, New York, N.Y.

[22] Filed: Mar. 15, 1974

[21] Appl. No.: 451,437

Related U.S. Application Data

[63] Continuation-in-part of Ser. No. 371,352, June 19, 1973, abandoned.

[52] U.S. Cl. ............... 250/343; 250/352; 356/246
[51] Int. Cl. ............................................ G01m 1/10
[58] Field of Search .......... 250/343, 344, 345, 352; 356/246

[56] References Cited
UNITED STATES PATENTS

| | | | |
|---|---|---|---|
| 2,970,512 | 2/1961 | Walters et al. | 250/345 |
| 3,177,756 | 4/1965 | Williams | 356/246 |
| 3,391,598 | 7/1968 | Graves et al. | 356/246 |
| 3,545,872 | 12/1970 | Noack | 356/246 |
| 3,552,864 | 1/1971 | Shields | 356/246 |
| 3,552,865 | 1/1971 | Leung et al. | 356/246 |
| 3,647,304 | 3/1972 | Emmel et al. | 356/246 |

OTHER PUBLICATIONS

"High Pressure, High Temp. IR-UV-Visible Spectrophotometer Cell in Situ Catalyst Studies," Tinker et al., Rev. of Sci. Ins., July 1972, Vol. 43, No. 7, pp. 1024–1025.

*Primary Examiner*—James W. Lawrence
*Assistant Examiner*—B. C. Anderson
*Attorney, Agent, or Firm*—M. L. Hendershot

[57] ABSTRACT

There is described an infrared cell capable of use in analyzing materials by infrared spectrum analysis while such materials are at high temperatures within the cell and the pressures within the cell are substantial. The cell of this invention can be used for batch or continuous analysis. The cell is provided with a unique sealing means to minimize damage to the infrared light transmitting windows located within the cell. The cell is provided with heating means for ensuring the temperature conditions under which analysis is effected.

6 Claims, 4 Drawing Figures

HIGH PRESSURE INFRARED CELL

This application is a continuation-in-part of our co-pending application, Ser. No. 371,352, filed June 19, 1973 now abandoned.

This invention is concerned with an infrared spectrum analysis cell which is useful at high pressures and high temperatures while continuously feeding and removing the materials being analyzed.

This invention relates to an infrared cell of a certain construction which allows the monitoring of continuously moving gaseous or liquid streams which are under pressures of at least about 500 lbs. per square inch absolute (psia) to about 50,000 lbs. psia and at temperatures of at least 100°C., preferably at least about 150°C., up to temperatures not exceeding about 500°C. The infrared cell of this invention possesses internal heating capabilities and can be used with a continuous, periodic or batch supply and withdrawal of materials therein depending upon the particular analytical problem under consideration.

Morris and Tinker, *Infrared Examination Of A Catalyst In Action*, Chemtech, September 1972, pages 554–559, point out that:

"Many reactions of both commercial and academic interest must be performed at elevated pressures and temperatures in order to achieve desirable reaction rates and equilibria. Observation and identification of the 'active catalyst' involved in such reactions has been a heretofore rare accomplishment. In many cases, the form of the 'active catalyst' has been inferred from the nature of the starting material and/or insolable species. However, these isolable species are actually the least soluble and/or most stable species in the solution at ambient conditions and are not necessarily representative of the 'active catalyst' that must be reactive and consequently not particularly stable. In other cases, the 'active catalyst' has been suggested from studies of related reactions and species at conditions which are far removed from the actual catalytic reaction conditions.

With the advent of homogenous catalysis by metal complexes new possibilities for the study of catalysis have arisen. One such possibility involves observation of a reaction system while the reaction is in progress. We have constructed a spectrophotometer cell which enables us to observe directly the infrared and ultraviolet-visible spectra of reacting solutions at high temperatures and pressures. This paper describes the cell and its application to the rhodium-catalyzed hydroformylation of olefins."

The infrared spectrum analysis cell described by Morris and Tinker comprises a cell body in which are located two infrared light transmitting windows separated from each other by a fixed metal spacer. The vulnerability of the construction of the Morris and Tinker cell is particularly viewable in FIG. 2 on page 556 of that article. In that FIG. 2, when pressure is applied, the windows (C) make direct contact with plugs (G). Spacer (D) insures that the windows are spaced apart before pressure is applied. In direct contact with windows (C) and spacer (D) are O-rings (E) which act to form a seal against gas leakage from the cell. They are supported by soft copper seats (F). Under extreme pressure conditions gas leakage between Spacer (D) and windows (C) occur causing O-rings to be compressed and deformed, frequently into the space between spacer (D) and windows (C). This causes windows (C) to be cracked rather readily and limits the utility of that cell construction to relatively low pressure analysis. The limits cited in the article on pressure is 2000 lbs. per square inch gauge.

Papanck and Fabry, *A High Pressure Optical Cell for Study Of Biochemical Solutions*, The Review of Scientific Instruments, volume 43, no. 5 May 1972, pages 738 and 739, describe the use of only copper seals to prevent gas leakage at the windows of their spectrographic analytical cell.

Noack, *An Infrared High Pressure Cell*, Spectrochimica Acta, volume 24A, pages 1917–1970, describes an infrared high pressure cell which can be used at pressure up to 200 atmospheres, that is, about 3000 psia. The cell of Noack also employs an O-ring seal which is in direct contact with the window and under pressures exceeding those contemplated by Noack, the seals would be forced between the cell wall and the windows to cause fracturing of the windows. The pressure limitations of the Noack seals are definitely insufficient for effecting the purposes outlined in the Morris and Tinker paper mentioned previously, which is, to observe extreme high pressure catalytic reactions while the reaction is in process. In the case where the reaction pressure used exceeds 3000 psia, the Noack cell is essentially useless.

With respect to the Morris and Tinker cell, reference is also made to an article by Tinker and Morris, *High Pressure, High Temperature, Infrared-Ultraviolet-Visible Spectrophotometer Cell for in situ Catalyst Studies*, The Review Of Scientific Instruments, volume 43, No. 7, July 1972, pages 1024 to 1026, which adds to the details of the Morris and Tinker article mentioned above. In this last article by Tinker and Morris, there is cited that one of the major difficulties in the past, and which have hindered construction of high pressure, high temperature, infrared cells, has been the window to metal seal which is employed. As pointed out at page 1025 of the article, the weak points in their cell construction is the window and the seals employed. As mentioned earlier, it has been determined that the construction of the Tinker and Morris cell is restricted in design to pressures which do not exceed their stated limits because of the direct contact existing between the O-rings (E) circumscribing and in contact with the windows. Thus, when the pressure applied exceeds the limits of Morris and Tinker, such as pressures in excess of 2000 psia, the O-ring is forced between the contacting surfaces of spacer (D) and windows (C) causing the latter to fracture at much lower pressures than, e.g., 20,000 psia.

Figures 2, 3, 4:
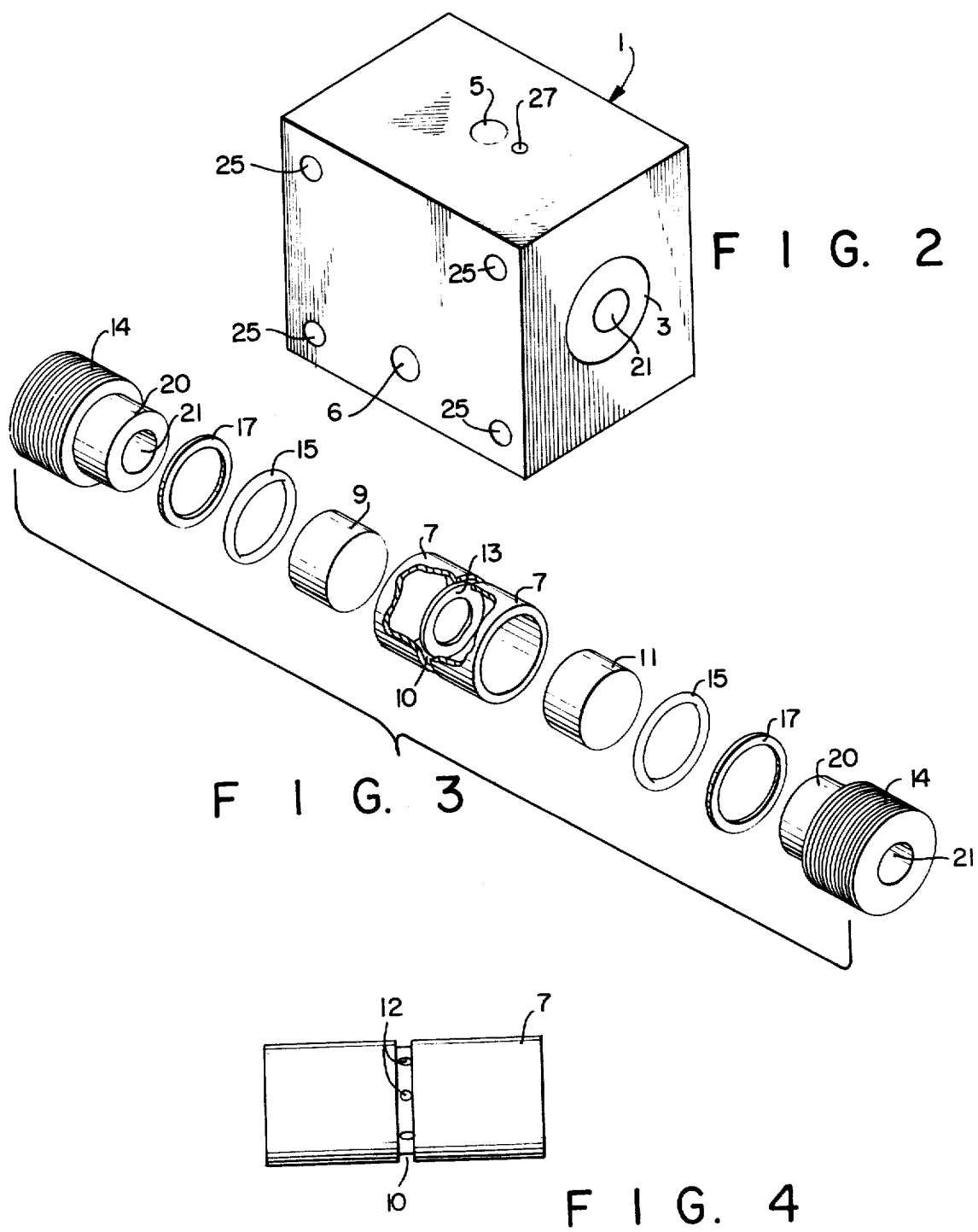

Fang et al., *Equipment For High Pressure Infrared Measurements*, Applied Spectroscopy, volume 24, no. 1, 1970, pages 21–27, describe a number of high pressure infrared cells. In FIG. 4 of that article is described a cell having capabilities of operation at 0 to 1500 atmospheres. In that cell, the windows are shown out of contact with any sealing surface and, hence gas flow at or about, and between the interface of the window and any other metal surface would be easily attacked causing rapid deterioration of the windows when employed at high pressure. The single plug high pressure cell shown in FIG. 5 of the Fang et al. article utilizes a plastic material, Teflon, which under pressure conditions within the cell would have flow characteristics which would force the Teflon into the interface between the window and the metal surface which it contacts. This causes rapid deterioration leading to shattering of the window.

There is described herein an infrared cell which operates conveniently at pressures up to 50,000 psia, and the usage of which under pressure is limited only by the strength of the materials of construction, particularly the infrared light transmitting windows which are employed.

The cell of this invention can be used at these high pressures while maintaining the materials to be analyzed continuously through the cell at a high temperature, e.g. 200+°C.

The cell comprises an aperture, preferably cylindrical, extending through a cell block. The block is made of pressure resistant metal, preferably a steel which readily withstands the pressures employed. The cell contains an inlet for passage of materials to be analyzed to a point in the cell located within the said aperture. The cell is provided with an outlet appropriately located to remove such materials to be analyzed from said point and thereafter from the cell. The cell block can be defined as encompassing the aperture and said inlets and said outlets.

Within the aperture is provided an open metal sleeve, also preferably cylindrical, and always conforming to the geometric shape of the aperture. The sleeve is machined so as to have holes which simultaneously mate with the said inlet and said outlet. Two infrared light transmitting windows are located in said sleeve and they have geometric designs which conform to the interior geometric design of said sleeve. While in said cell, each window is located on each side of said holes in said sleeve and they are spaced from one another by a spacing means, e.g., a spring-like metal spacing means.

The cell block possesses two plugs fitted into each end of said aperture. Each plug contains an inner optically flat surface which has been ground and polished to within about one wave-length interference of sodium light and are each in direct contact with a window surface. The inner end portion of each block has a cross sectional area normal to the axis of the aperture which is smaller than the internal cross sectional area of the sleeve. The inner end portions have a geometric shape conforming to the internal shape of the sleeve. Each of these end portions are partly located within the separate ends of the sleeve. Each of these end portions are circumscribed by at least two sealing means, a first and second sealing means. Each of the first sealing means is in direct contact with an end surface of said sleeve and is out of contact with the window closest to it. The second sealing means is removed from the sleeve by the first sealing means and holds each first sealing means in its position when the first sealing means is expanded by applied pressure.

The plugs are desirably constructed to have a contact-slide fit within the sleeve. In addition, each plug desirably contains a shoulder or flange means which engages the pressure-absorbing sealing means that is disposed between said flange surface and the surface of said sleeve which it faces.

In the preferred aspect of the present invention the aperture, sleeve, windows and plugs are cylindrical, and the plugs are threaded to be fitted into each of the corresponding threaded ends of said aperture in said cell block. The inner end portion of each such preferred plug is unthreaded and has a cross-sectional diameter normal to the axis of the aperture which is smaller than the internal cross-sectional diameter of the sleeve. Each of these unthreaded end portions are partly located within the separate ends of the sleeve.

In another embodiment, the inner end portions of the plugs may be threaded provided the interior ends of the sleeve into which they are fitted have mated threads. In such a case, it is preferable, though not necessary, that not all of each end portion be threaded, only the section of each which fits into the sleeve.

Though only threaded, metal cylindrical plugs have been illustrated hereinbelow and in the drawings, other shaped and designed plugs may be obviously substituted. For example, plugs containing exterior threaded bosses fitted with matching caps; or spring loaded bayonet type cap elements; or exterior plates bolted or screwed to the main body; or any similar structural elements functionally capable of retaining the specified interior pressures, can be employed for the preferred plugs.

Each block possesses an infrared light transmitting hole located about the axis of said aperture and extending through said plugs. The cell block is provided with heating means for control and monitoring the temperature of the cell block.

In order to further illustrate and characterize this invention, reference is made to the drawings which contain FIGS. 1, 2, 3 and 4.

With respect to FIG. 1, it shows a cross-sectional view of a cell embodying the features of this invention.

With respect to FIG. 2 it shows an isometric view of the external appearance of the cell of FIG. 1.

With respect to FIG. 3, it shows, in exploded form, the assembly of parts which are located in the aperture of the cells of FIGS. 1 and 2.

With respect to FIG. 4, it particularly points out the construction of the sleeve depicted in detail in FIGS. 1 and 2.

With regard to FIGS. 1, 2, 3 and 4, cell block 1 is constructed of heat hardened steel or stainless steel such as stainless 316 of Hastelloy C (see the Morris and Tinker article supra). The cell block is fitted with four holes 25 for introduction of tubular heaters, such as 50 watts tubular heaters (not shown) and hole 27 in which is provided a thermister (not shown) for the purpose of controlling the temperature of the block and hence the temperature of any materials within the block.

In each end of block 1 is provided plugs 3 which possess threaded portions 4 and a smaller diameter unthreaded portions 20. Cell block 1 possesses a mating thread so as to receive said plugs. The opening into which each of the plugs 3 are fitted defines an aperture extending through the whole of cell block 1 and has an axis which is common to the axis of light transmitting holes 21 extending through said plugs 3. At the top of cell 1 is inlet hole 5 through which materials to be analyzed are passed to sample area 8 within said aperture where analysis is effected. The gas is removed from cell block 1 via outlet 6.

Located internally of said block 1 and said aperture is cylindrical metal sleeve 7. Sleeve 7 possesses one or more holes, 10 and 12, serving to provide ready access of materials to area 8 from inlet 5 and thence to outlet 6. Metal sleeve 7 circumscribes optically ground infrared light transmitting windows 9 and 11, each located about area 8. Each window is in contact with an optically flat inner surface 19 of plugs 3. As shown in FIGS. 1 and 3, optically flat surfaces 19 are in total contact with the surfaces of window 9 and 11.

The term "optically flat" means a surface which has been ground and polished to within one wavelength of sodium light.

Before pressure is applied by introduction of materials through inlet 5, pressure is applied to separate windows 9 and 11 by the action of wave ring 13 which is an irregular shaped washer which possesses a spring-like quality. Ring 13 possesses an interior hole which circumscribes area 8 and allows continued passage of light through openings 21.

An important characteristic of the cell of this invention is that sleeve 7 overlaps the unthreaded portions 20 of plugs 3. To insure that no gas leakage will occur, and to also insure that no nonmetalic material will be caused to contact with windows 9 and 11, sealing rings 15 are located, in each case, about the unthreaded portions 20 of plugs 3 and make contact with the end portions of cylindrical sleeve 7. Each sealing ring 15, preferably O-rings made of rubber or plastic such as Teflon, are simultaneously in direct contact with the adjacent end of cylinder 7, the adjacent inner wall of cell 1 defining the aperture, the adjacent exterior surface of unthreaded portion 20 of plugs 3, and a secondary sealing means 17. Sealing rings 15 define a first sealing means against gas leakage from the sample area 8. At no time do sealing rings 15 contact windows 9 and 11.

Secondary sealing means 17 serve as a secondary source of protection from gas leakage via the threaded portion of the plugs. It is typically made of a soft metal which is capable of being deformed by the first sealing means, that is sealing rings 15, when such pressure is applied as to force the first sealing means into the second sealing means 17. A particularly preferred construction for second sealing means 17 is the K-ring configuration depicted in FIG. 1. This sealing combination has been established to be capable of withstanding pressures of 30,000 psia and should withstand pressures up to 50,000 psia.

The preferred window composition in the practice of this invention is zinc sulfide such as Irtran-2, see Table 1 in the Fang et al. article, supra. Other high pressure window materials such as characterized in Table 1 of Fang et al. can be considered so long as due recognition is made of their inherent deficiencies under high pressure. Each window must be optically flat so as to insure an excellent seal when in contact with surfaces 19 of plugs 3.

It should be pointed out that the wave ring is simply a device to provide expansive forces necessary to mate the window surfaces with the optically flat surfaces 19. It must, of course, be thinner than the available sample thickness that is defined by area 8 within the aperture. The ring can be made by cutting washer shaped pieces from a stainless steel sheet of appropriate thickness and crimping the washer in such a manner that it provides a spring action when flattened.

With respect to the specific details of K-rings 17 of FIG. 1, it should be noted that these rings are a self-energizing device under the pressures imposed. The rings are machined of copper or any other relatively soft material such that an O-ring, such as 15, can ride in the "V" structure of the K-ring construction. When pressure is exerted on O-ring 15, the pressure is transmitted to the K-ring forcing the sides of the V structure to seal against plugs 3 and cell body 1. These rings are desirably machined to exact tolerances within 0.001 inch. These tolerances, in practice, can be critical in that sizes which are too small will not allow the proper compressive forced to develop thereby effecting maximum sealing, while sizes too large extrude the O-ring material. In addition, sizes of the K-ring which are too large also chafe off bits of the soft metal into sample area 8.

With regard to the first sealing means, that is, rings 15, they are preferably O-rings. These rings should be made of a material which is soft enough to provide an initial compressive seal to allow high pressures to be developed. The material of construction should be inert to any solvent in the reaction mixture sample which attacks the seal at the temperatures at which the analysis is being effected. No swelling of the O-rings can be allowed since it would expand the ring into the window-metal interface area. Teflon, a Trademark of E. I. duPont de Nemours Inc., Wilmington, Del., is polytetrafluoroethylene and works well when it is not caused to be extruded under the pressure conditions as for example occurs in the high pressure seal of FIG. 5 of Fang et al., supra.

The metal cylindrical sleeve 7 is characterized as a single piece. This is not necessary. Sleeve 7 may be made of a plurality of metal rings which when put together, and under pressure, unitized into a cylindrical surface to effectively seal windows 9 and 11 from contact with first sealing means 15. As shown in the drawings, sleeve 7 possesses a plurality of holes interconnected with inlet 5 and outlet 6, but that is not critical. Instead of holes, the open connections within inlet 5 and outlet 6 may be slots or any other geometric configuration which allows effective utilization of the sleeve. The cylindrical sleeve also serves a very important function of eliminating any dead volume which exists in sample area 8. It is desirable that it also be machined to very close tolerances, for example, within 0.001 inch.

The combination of the dimensions of sleeve 7, ring 15, second sealing means 17 and plug 3 is significant with respect to the effectiveness of the two sealing means employed. It is desirable that the sealing means to be sized so as to generate approximately 0.01 inch compression, that is, the dimensions of these components must be 10/1000 larger than the available space for them so as to ensure a maximum seal.

In a specific embodiment of the invention, the preferred windows are made of Irtran-2, a trademark of Eastman Kodak, Rochester, N.Y. They are made from zinc sulfide pellets which are hot, for example, 2500°F, pressed at about 40,000–50,000 psia.

What is claimed is:

1. An infrared cell capable of use in analyzing materials while at high temperatures and pressures and while passing continuously through said cell, comprising an aperture extending through said cell, an inlet for transmitting materials to be analyzed to a point in said cell located within said aperture, an outlet located in said cell for removing such material from said point and thereafter from said cell, a cell block encompassing said aperture and said inlet and outlet, an open metal sleeve located within said aperture having holes mated with said inlet and said outlet into the aperture, two infrared light transmitting windows located in said sleeve having geometric designs conforming to the interior of said sleeve, and being located one on each side of said holes and being spaced from one another by a spacing means, two plugs fitted into and secured in each end of said aperture each of which contains an inner optically flat surface which has been ground and polished to within about one wavelength interference of sodium light and are each in direct contact with a window surface, the inner end portions of each plug having a cross-sectional area normal to the axis of the aperture which is smaller than the internal cross-sectional area of the sleeve, having a geometric shape conforming to the internal shape of the sleeve, and being located within the separate ends of the sleeve, each of said portions being circumscribed by two sealing means, the first sealing means is in direct contact with an end surface of said sleeve and is out of contact with said window, and the second sealing means is removed from the sleeve end surface by the first sealing means and holds the first sealing means in position when the first sealing means is expanded by applied pressure, an infrared light transmitting hole located in each plug, heating means provided in said cell block and means in said cell block for controlling and monitoring the temperature in the cell block.

2. The cell of claim 1 wherein said windows are made of zinc sulfide.

3. The cell of claim 1 wherein said first sealing means is a polytetrafluoroethylene O-ring and said second sealing means is a copper K-ring.

4. The cell of claim 1 wherein said sleeve conforms to the geometric shape of said aperture.

5. The cell of claim 4 wherein said aperture is cylindrical in shape.

6. The cell of claim 1 wherein said plugs and aperture are threaded.

* * * * *